United States Patent
Zhang

(10) Patent No.: US 9,276,805 B2
(45) Date of Patent: Mar. 1, 2016

(54) METHOD FOR BACKING UP LINK STATE ADVERTISEMENT

(75) Inventor: Changjun Zhang, Hangzhou (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 114 days.

(21) Appl. No.: 13/900,547

(22) PCT Filed: Jan. 12, 2012

(86) PCT No.: PCT/CN2012/070278
§ 371 (c)(1),
(2), (4) Date: May 23, 2013

(87) PCT Pub. No.: WO2012/095012
PCT Pub. Date: Jul. 19, 2012

(65) Prior Publication Data
US 2013/0308441 A1    Nov. 21, 2013

(30) Foreign Application Priority Data
Jan. 12, 2011  (CN) .......................... 2011 1 0005532

(51) Int. Cl.
H04L 12/28    (2006.01)
H04L 12/24    (2006.01)
H04L 12/715   (2013.01)
H04L 12/707   (2013.01)
H04L 12/703   (2013.01)

(52) U.S. Cl.
CPC ............ *H04L 41/0654* (2013.01); *H04L 45/04* (2013.01); *H04L 45/22* (2013.01); *H04L 45/28* (2013.01)

(58) Field of Classification Search
None
See application file for complete search history.

(56) References Cited

U.S. PATENT DOCUMENTS

| 6,983,294 | B2 | 1/2006 | Jones et al. |
| 2003/0218982 | A1 | 11/2003 | Folkes et al. |
| 2006/0215547 | A1 | 9/2006 | Koppol |
| 2009/0086622 | A1 | 4/2009 | Ng |
| 2009/0116514 | A1* | 5/2009 | Yan et al. ....................... 370/509 |

FOREIGN PATENT DOCUMENTS

| CN | 101425961 | 5/2009 |
| CN | 102025552 | 4/2011 |

OTHER PUBLICATIONS

First Office Action dated Jun. 20, 2012 issued on CN Patent Application No. 201110005532.0 filed on Jan. 12, 2011, The State Intellectual Property Office, the P.R. China.
International Search Report and Written Opinion dated Apr. 26, 2012 issued on PCT Patent Application No. PCT/CN2010/070278 dated Jan. 12, 2012, SIPO, PRC, 11 pages.
Extended European Search Report dated Apr. 22, 2015, EP Patent Application No. 12734608.8 dated Jan. 12, 2012, European Patent Office.

* cited by examiner

*Primary Examiner* — Anh-Vu Ly
(74) *Attorney, Agent, or Firm* — Mannava & Kang, P.C.

(57) ABSTRACT

The present disclosure provides a method for backing up a link state advertisement (LSA) for use in a distributed device comprising a main control board and an interface board. The main control board comprises a primary board and a standby board. The method comprises: receiving by the standby board LSA related information sent by the primary board; and generating by the standby board an LSA according to the LSA related information.

11 Claims, 5 Drawing Sheets

---

301 — The standby board receives the LSA related information sent by the primary board 302 — The primary board sends an interface enabling notification to the standby board according to a sequence of enabling interfaces of the distributed device 303 — The standby board generates an LSA corresponding to an interface according to the sequence of receiving the interface enabling notifications

METHOD FOR BACKING UP LINK STATE ADVERTISEMENT

The present application is a 371 application of International Application No. PCT/CN2012/070278 filed on Jan. 12, 2012 and entitled "Method for Backing up Link State Advertisement," which claims the benefit of Chinese Patent Application No. 201110005532.0 filed on Jan. 12, 2011.

BACKGROUND

Open Shortest Path First (OSPF) is a link-state based interior gateway protocol developed by the Internet Engineering Task Force (IETF) organization. At present, OSPF Version 2 (RFC 2328) is used for IPv4 protocol. OSPFv3 is developed on the basis of OSPF, in order to support IPv6.

OSPFv3 protocol divides an autonomous system into different areas. The term "area" refers to that routers are divided logically into different groups, with each group being identified by an area ID. For example, a network system is divided into five areas Area 0 through Area 4, wherein one of the areas (such as Area 0) is connected to all the other areas Area 1 through Area 4 and is called the backbone area. The link state information of OSPFv3 diffuses only within the range of an area. Each area has an independent link state information library, and an independent Shortest Path First (SPF) calculation is performed within each area.

Link State Advertisement (LSA) is the main source for OSPFv3 protocol calculating and maintaining the routing information. RFC5340 defines several types of LSAs including Router-LSA, Network-LSA, Inter-Area-Prefix-LSA, Inter-Area-Router-LSA, AS-External-LSA, Link-LSA and Intra-Area-Prefix-LSA.

Intra-Area-Prefix-LSA: OSPFv3 moves the IP prefix directly reachable to the present machine which was notified by the stub link of the Router-LSA and the IP network segment of the broadcast network which was notified by the Network-LSA in OSPF to this type of LSA. This LSA propagates within an area, and is used for notifying in an area the IP prefix that is directly reachable within the area. Because this LSA can be generated according to a stub link, or generated according to a network LSA, so this LSA further functions as a reference type: being 2001 in case reference is made to a router LSA, and being 2002 in case reference is made to a network LSA.

DETAILED DESCRIPTION

Figure 1:
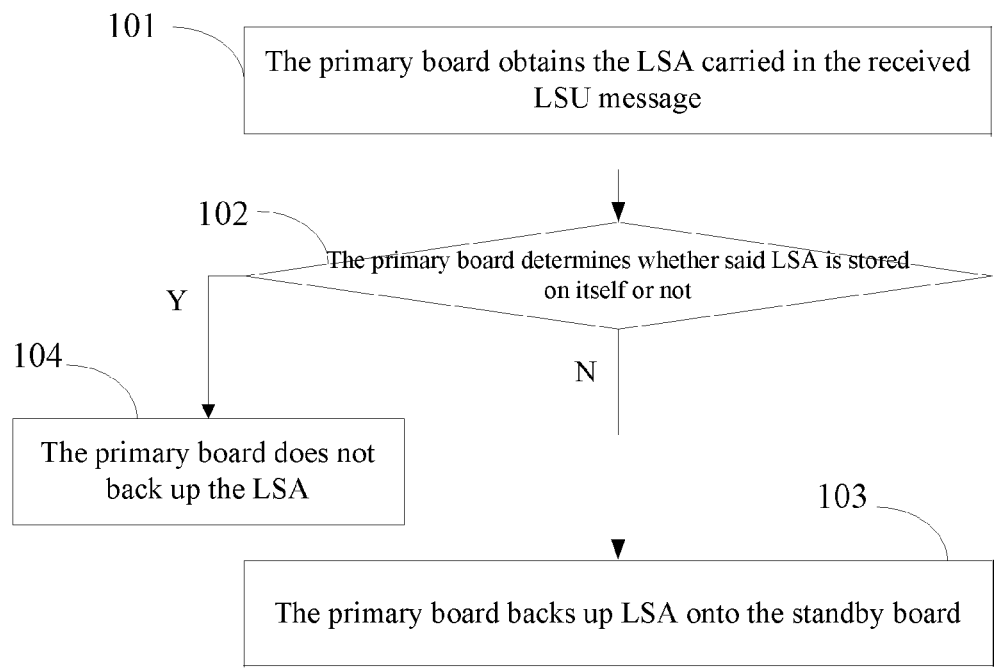
FIG. 1 is a flow chart of a method for backing up a link state advertisement according to an example.

Nowadays there are a lot of distributed devices on the internet. A distributed device comprises a main control board and a plurality of interface boards. The software on the main control board is the control software, which is responsible for processing user's various configuration information and running various protocols, e.g., running a routing protocol such as OSPFv3 to discover a route and send it to the interface boards. The software on all interface boards belongs to the forwarding software that maintains its forwarding table according to the notification message from the main control board, and forwards data according to the forwarding table.

To further improve the reliability and robustness of the system, a distributed device is usually provided with two main control boards, wherein a primary board (primary main control board) is responsible for normal operation, and a standby board (standby main control board) acts as a backup, and takes over corresponding operations once the primary board fails.

By adopting the above distributed structure with the control and forwarding being separated, the normal operation of the forwarding software will not be affected by restarting or reloading of the control software. Therefore, as long as the network topology remains stable during the restarting or reloading of the controlling software, a router that is being restarted can still perform data forwarding on a forwarding path. However, after a successful restarting or reloading of the control software, the neighboring relationship between the present device and the surrounding devices needs to be re-established, and all routing information data needs to be synchronized again, which is no different from the process of newly discovering a neighbor. The surrounding devices would trigger route calculation because of the disruption of neighboring relationship, resulting in route oscillation and forwarding disruption on the network.

To avoid this, there is provided a Non-Stop-Routing (NSR) solution. An NSR property is configured on the distributed device, and the data on the primary board is backed up onto the standby board. In case a primary/standby switching happens on a device, the standby board of this device seamlessly takes place of the original primary board to operate and the information such as neighbors and routes already existing thereon will not cause any change to its relationship with a neighboring device, so the flow in the whole network remains stable. In this NSR solution, normally the standby board does not generate an LSA and it only generates an LSA in case of primary/standby switching.

In the following detailed description, certain examples are described with reference to the drawings.

According to an example, the primary board sends LSA related information to the standby board, and the standby board generates an LSA by itself according to the LSA related information sent by the primary board.

The LSAs on a distributed device can be divided into two types: one type is the LSA of other devices, e.g., an LSA obtained by the primary board from the received LSU message; and the other type is the LSA generated by the distributed device itself.

Methods for obtaining these two types of LSA by the standby board are described below. A method for obtaining the first type of LSA by the standby board is described first.

With reference to FIG. 1, FIG. 1 illustrates a flow chart of a method for backing up a link state advertisement according to an example. This method is used in a distributed device which comprises a main control board and a plurality of interface boards. The main control board further comprises a primary board and a standby board. The primary board exchanges LSU (Link State Update) messages with other distributed devices. A particular field in the LSU message carries an LSA. Based on the configuration, the primary board obtains from this particular field the LSA carried by the received LSU message. After the LSA is obtained, the primary board searches a local database to see if the LSA has been stored. If the database does not store the LSA, the LSA is stored in the database, and the primary board backs up the LSA onto the standby board through interboard communication. However, if the database has stored the LSA, the LSA is not backed up, e.g., the LSA can be discarded.

It should be noted that the primary board backing up an LSA onto the standby board can happen each time the primary board obtains an LSA not stored in the database, or after the primary board has obtained LSAs many times, i.e. the primary board may package these LSAs which are obtained many times and then send them to the standby board.

More specifically, as shown in FIG. 1, the method comprises:

Block 101, the primary board obtains an LSA carried in the received LSU message;

Block 102, the primary board determines whether the LSA is stored on itself or not; if the determining result is no, block 103 is executed; and if the determining result is yes, block 104 is executed.

Block 103, the primary board backs up the LSA onto the standby board.

Block 104, the primary board does not back up the LSA. For example, the primary board may discard the LSA.

A method for obtaining the second type of LSA by the standby board is described next.

Figure 2:
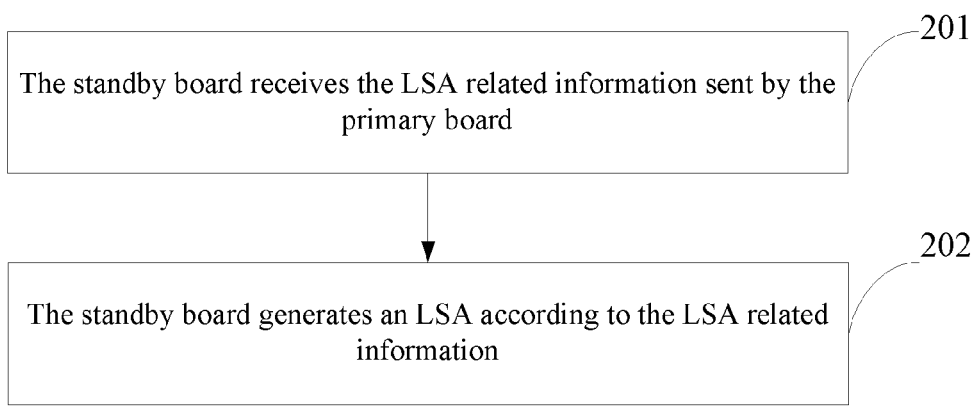
FIG. 2 is a flow chart of a method for backing up a link state advertisement according to another example.

With reference to FIG. 2, FIG. 2 illustrates a flow chart of a method for backing up a link state advertisement according to another example. In this example, as shown in block 201, the standby board receives the LSA related information sent by the primary board. That is to say, the primary board backs up the LSA related information such as Hello message information, interface information and neighbor information onto the standby board, enabling the standby board to have the ability to generate an LSA. Then, as shown in block 202, the standby board can generate an LSA by itself based on the LSA related information. After generating an LSA, the standby board can obtain the routing information according to the LSA, so there is no need for the primary board to back up the routing information onto the standby board through interboard communication, thus avoiding the problem of interboard communication congestion resulted from the interboard communication of large amounts of routing information.

However, if the primary board and the standby board have inconsistent LSAs, the LSDBs of the primary board and the standby board will be inconsistent. In order to avoid this, an example describes a process for generating various types of backup LSAs by the standby board in the distributed device.

1. Backup of Router-LSA

Router-LSA: Router-LSA is generated by each router and describes the link state and overhead of the present router. It propagates only in the area where the router is located. The Router-LSA of OSPFv3 is used to notify information about the P2P neighbor and broadcast network neighbor of the present machine, that is to say, the Router-LSA of OSPFv3 is used to describe the network topology.

Router-LSA describes the interfaces and neighboring relationships of a device. If the Router-LSAs generated by the primary board and the standby board correspond to different interfaces, the correspondence between an interface and a Link State ID (LSID) in the primary board will be inconsistent with the correspondence between the interface and LSID in the standby board. The LSID is used for uniquely identifying an LSA.

Figure 3:
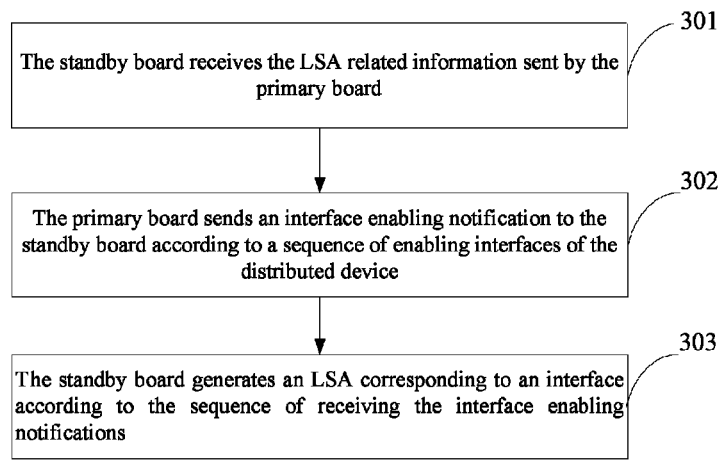
FIG. 3 is a flow chart of a method for backing up a link state advertisement according to yet another example.

With reference to FIG. 3, FIG. 3 illustrates a flow chart of a method for backing up a link state advertisement according to yet another example, wherein block 301 is the same as block 201 described above. In this example, as shown in block 302, before the standby board generates an LSA according to the LSA related information, the primary board sends notifications in turn to the standby board according to a sequence of enabling interfaces, and as shown in block 303, the standby board generates a Router-LSA that corresponds to an interface according to the sequence of receiving notifications. In other words, the primary board and the standby board generate a Router-LSA that corresponds to an interface according to the same sequence of enabling interfaces, thus ensuring that the correspondence between a Router-LSA and an interface on the primary board and that on the standby board are consistent.

2. Backup of Network LSA and Link LSA

Network-LSA: Network-LSA is generated by a Designated Router (DR) of a broadcast network and a Non-Broadcast Multi-Access (NBMA) network, describes a link state of an interface of the present network segment. It propagates only in the area where the DR is located. Similar to Router-LSA, the Network-LSA of OSPFv3 notifies all nodes connected with the present broadcast network via an attached router, and is used to describe the network topology information.

Link-LSA: A router generates a Link-LSA for each link and the Link-LSA propagates within the local range of the link. Each link-LSA describes the IPv6 address prefix connected to the link and the Link-local address of the router.

The LS IDs of the Network LSA and Link LSA are interface indexes. Therefore, if the interface indexes for the same interface are different on the primary board and the standby board, the LS IDs generated on the primary and standby boards for the same interface are different, i.e. the LSAs corresponding to the same interface are different. To solve this problem, according to an example, the primary board and the standby board are configured in advance so that the same interface would have the same interface index.

3. Backup of Inter-Area-Prefix-LSA, Inter-Area-Router-LSA, AS-External-LSA, and Intra-Area-Prefix-LSA Inter-Area-Prefix-LSA: Inter-Area-Prefix-LSA is generated by an Area Border Router (ABR), and propagates within an area associated with the LSA. Each Inter-Area-Prefix-LSA describes a route to the IPv6 address prefix of other areas in the present autonomous system and is used for notifying reachable IP prefixes among areas.

Inter-Area-Router-LSA: Inter-Area-Router-LSA is generated by an ABR, and propagates within an area associated with the LSA. Each Inter-Area-Router-LSA describes a route to an Autonomous System Border Router (ASBR) in the present autonomous system and is used for describing the network topology to an ASBR node.

AS-External-LSA: AS-External-LSA is generated by an ASBR, describes a route to other Autonomous Systems (AS), and propagates to the whole AS (except Stub areas). A default route can also be described using an AS-External LSA, for notifying a reachable IP prefix introduced into the OSPF from other protocols.

When the primary board and the standby board generate these types of LSAs, inconsistencies may occur as the correspondences between a route and an LS ID are not consistent. For example, OSPFv3 introduces two static routes (external routes), which are respectively 1000::1001 and 1000::1002. If the primary board first generates an LSA according to the route of 1001 and then generates an LSA according to the route of 1002, the LS ID corresponding to the route of 1001 is 1, and the LS ID corresponding to the route of 1002 is 2. However, if the standby board first generates an LSA according to the route of 1002, and then generates an LSA according to the route of 1001, the LS ID corresponding to the route of 1002 is 1 and the LS ID corresponding to the route of 1001 is 2. Therefore, the LS IDs for the same route are different.

Figure 4:
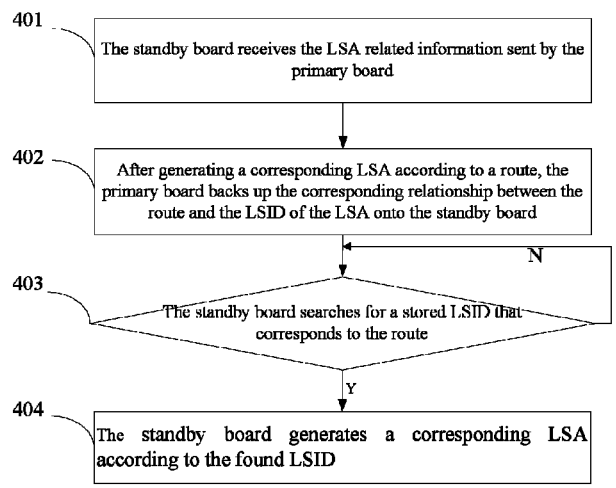
FIG. 4 is a flow chart of a method for backing up a link state advertisement according to yet another example.

In order to make sure that the correspondences between a route and an LS ID on the primary board and the standby board are consistent, another example provides a method for backing up a link state advertisement, as shown in FIG. 4. Block 401 is the same as block 201 described above. As shown in block 402, after generating an LSA corresponding to the route, the primary board backs up the correspondence between the route and the LS ID of the LSA onto the standby board. The standby board generates by itself an LSA according to the introduced route (for example), but as shown in block 403, before generating an LSA according to the route, the standby board first searches to check if there is a stored LS ID corresponding to the route. If a corresponding LS ID is found, as shown in block 404, the standby board generates an LSA according to the found LS ID; and if no corresponding LS ID is found, it waits a period of time and searches again, as the NO branch of FIG. 4 indicates. Alternatively, each time the standby board receives the correspondence between a route and an LS ID sent by the primary board, it searches to see whether the route is stored; if the searching result is yes, it generates a corresponding LSA according to the LS ID of the route.

It should be noted that, if the primary board deletes an LSA, the primary board notifies the standby board that the correspondence between a route and an LS ID of the LSA is deleted, and the standby board deletes the corresponding LSA according to the notification, thus ensuring that the relationship of the route and LS ID between the primary board and the standby board are consistent.

Additionally, with respect to the intra-prefix LSA, it is not only necessary to back up the correspondence between a route and an LS ID, but also necessary to back up the reference type of the LSA. When the standby board generates an LSA according to a route, it not only needs to find the LS ID corresponding to the route, but also needs to find the reference type of the LSA corresponding to the route.

Backing up of the above three types of LSAs enables the standby board to generate its own LSA, and at the same time, guarantees the consistency of the LSAs on the primary board and standby board, i.e., guarantees the consistency of the LSDBs on the primary board and standby board.

In the above examples, the standby board of a distributed device generates an LSA by itself and there is no need for the primary board to back up large amounts of routing information onto the standby board through interboard communication, thereby avoiding the problem of running out of memory due to accumulating too much routing information. At the same time, the primary board obtains the LSA carried in the received LSU message, and backs up the LSA onto the standby board, without having to back up the LSU message, thus preventing a large amount of LSU messages from occupying the bandwidth for interboard communication.

Figure 5:
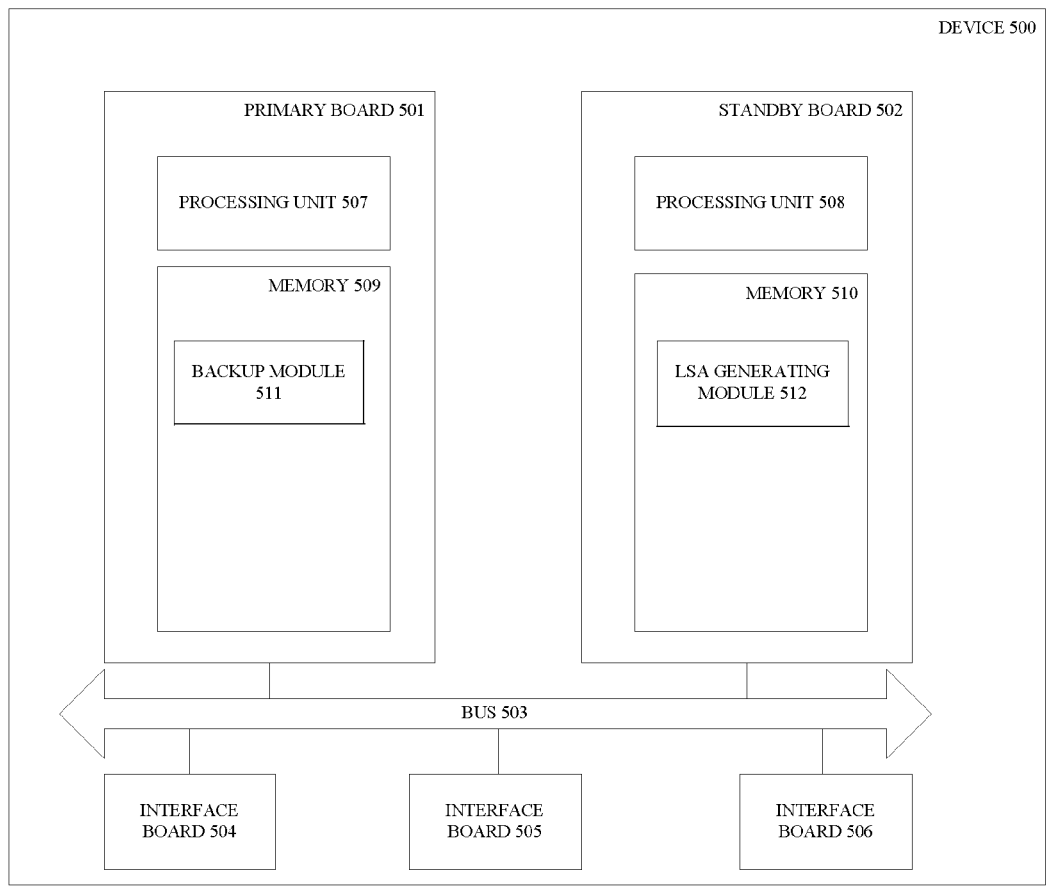
FIG. 5 is a schematic diagram of a distributed device according to an example.

With reference to FIG. 5, FIG. 5 illustrates the schematic block diagram of a distributed device 500 according to another example. As shown, the distributed device 500 comprises a main control board such as 501 and 502 and at least one interface board such as interface board 504, 505 and 506. The main control board further comprises a primary board 501 and a standby board 502. The primary board 501 and the standby board 502 and the interface boards 504-506 are coupled by a bus 503. The bus 503 can include any one or combination of different bus structures, such as a memory bus or memory controller, a peripheral bus (e.g. PCI, PCIe, AGP, LPC), a universal serial bus and/or a processor or local bus that utilizes any of a variety of bus architectures. The primary board 501 and the standby board 502 comprise a processing unit 507 or 508 respectively. The processing unit 507 or 508 can be any of various commercially available processors such as micro-processor, micro-controller, digital signal processor (DSP), single-core units and multi-core units, which are used to execute instructions or program codes stored in memory 509 or memory 510. The memory 509 or 510 can include computer-readable storage (physical storage media) such as a volatile memory (e.g. random access memory (RAM)) and non-volatile memory (e.g. ROM, EPROM, EEPROM etc.). A backup module 511 which for example is embodied as a computer software program is comprised in the memory 509. The backup module 511 is configured to send LSA related information to the standby board over bus 503 and an LSA generating module 512, which is also comprised in the memory 510 of the standby board 502 as for example a computer software program, is configured to receive the LSA related information sent by the backup module 511 and generate an LSA according to the LSA related information.

Although not shown, the distributed device 500 can also include some other components such as an external storage device, an input device, an output device etc.

According to an example, in the distributed device 500, an identical interface index is configured for the same interface on the primary board and the standby board.

According to another example, the backup module 511 in the primary board 501 is further configured to: after a corresponding LSA is generated according to a route, back up the correspondence between the route and the LSID of the LSA onto the standby board 502; and accordingly, when generating an LSA according to a route, the LSA generating module 512 in the standby board 502 is further configured to first search for a stored LSID that corresponds to the route and after having found the corresponding LSID, to generate a corresponding LSA according to the LSID. The LSA generating module 512 is further configured to carry out the searching again after a preset time if no LSID corresponding to the route is found.

Figure 6:
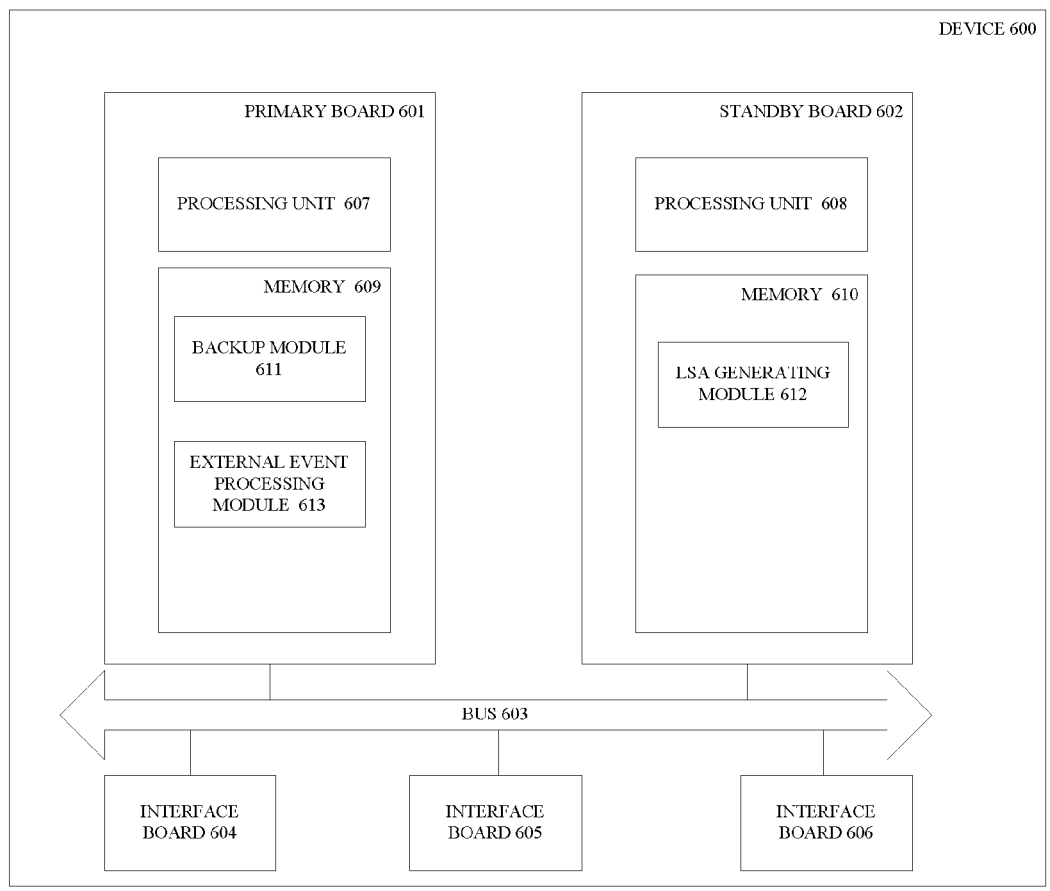
FIG. 6 is a schematic diagram of a distributed device according to another example.

With reference to FIG. 6, FIG. 6 illustrates a schematic block diagram of a distributed device 600 according to yet another example. FIG. 6 is identical with FIG. 5, except that the primary board 601 in the distributed device 600 further comprises an external event processing module 613. The external event processing module 613 is configured to send interface enabling notifications to the standby board 602 according to a sequence of enabling interfaces of the distributed device 600; accordingly, the LSA generating module 612 in the standby board 602 is further configured to generate an LSA that corresponds to an interface according to a sequence of receiving the interface enabling notifications. Operations by the other components in FIG. 6 are the same as FIG. 5 and will not be described in detail herein.

Figure 7:
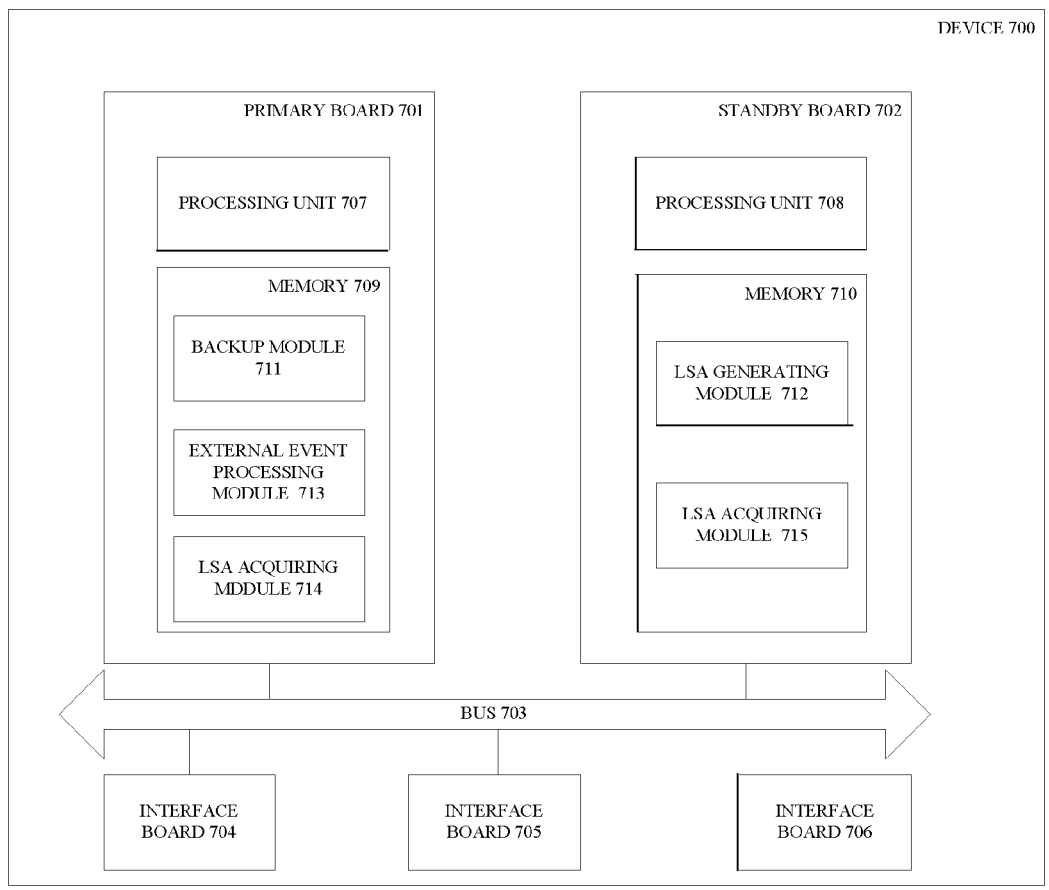
FIG. 7 is a schematic diagram of a distributed device according to yet another example.

With reference to FIG. 7, FIG. 7 illustrates a schematic block diagram of a distributed device 700 according to still another example. FIG. 7 is identical with FIG. 6, except that the distributed device 700 in FIG. 7 further comprises an LSA acquiring module 714 in the primary board 701 and another LSA acquiring module 715 in the standby board 702. According to an example, the LSA acquiring module 714 in the primary board 701 is configured to obtain the link state advertisement (LSA) carried in the received link state update (LSU) message. The backup module 711 then determines whether the LSA obtained by the LSA acquiring module 714 is stored on the primary board 701 or not, and sends the LSA to the standby board 702 if the determining result is no and not sends the LSA to the standby board 702 if the determining result is yes. Accordingly, the LSA acquiring module 715 in the standby board 702 is further configured to receive and store the LSA sent by the backup module 711. Operations by the other components in FIG. 7 are the same as FIG. 6 and will not be described in detail herein.

According to an example, the standby board of the distributed device generates an LSA by itself and there is no need for the primary board to back up large amounts of routing information onto the standby board through interboard communication, thereby avoiding the problem of running out of memory due to accumulating too much routing information. At the same time, the primary board obtains the LSA carried in the received LSU message, and backs up the LSA onto the standby board, without having to back up the LSU message, thus preventing a large amount of LSU messages from occupying the bandwidth for interboard communication.

From the above depiction of the implementation mode, the above examples can be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.) The processes, methods and functional units may all be performed by a single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

Although the flow diagrams described above show a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

What is claimed is:

1. A method for backing up a link state advertisement (LSA), for use in a distributed device comprising a main control board and an interface board, wherein said main control board comprises a primary board and a standby board, wherein said method comprises:
   receiving by said standby board LSA related information sent by said primary board;
   sending by said primary board an interface enabling notification to said standby board according to a sequence of enabling interfaces of said distributed device; and
   generating by said standby board an LSA according to said LSA related information by generating the LSA to correspond to an interface according to the sequence of receiving the interface enabling notifications.

2. The method of claim 1, wherein an identical interface index for a same interface is configured on said primary board and said standby board.

3. The method of claim 1, wherein, before said standby board generates an LSA according to said LSA related information, the method further comprises:
   after said primary board generates a corresponding LSA according to a route, backing up the correspondence between said route and a link state identifier (LSID) of said LSA onto the standby board;
   said generating by said standby board an LSA according to said LSA related information further comprises:
      searching by said standby board for a stored LSID that corresponds to said route when said standby board generates the LSA according to the route; and
      after having found the corresponding LSID, generating by said standby board a corresponding LSA according to the found LSID; and if no corresponding LSID is found, carrying out, by said standby board, the searching again after a preset time.

4. The method of claim 1, further comprising:
   obtaining by said primary board an LSA carried in a received link state update (LSU) message;
   determining by said primary board whether said LSA carried in the received LSU message is stored on the primary board;
   backing up said LSA carried in the received LSU message onto said standby board in response to a determination that the LSA carried in the received LSU message is stored on the primary board; and
   not backing up said LSA carried in the received LSU message onto said standby board in response to a determination that the LSA carried in the received LSU message is not stored on the primary board.

5. A distributed device comprising a main control board and an interface board, wherein said main control board comprises a primary board and a standby board, wherein
   said primary board comprises a primary board processing unit and a primary board memory on which is stored machine readable instructions that are to cause the primary board processing unit to:
      send link state advertisement (LSA) related information to said standby board; and
      send an interface enabling notification to said standby board according to a sequence of enabling interfaces of said distributed device; and
   said standby board comprises a standby board processing unit and a standby board memory on which is stored machine readable instructions that are to cause the standby board processing unit to:
      receive the LSA related information sent by said primary board, and generate an LSA according to said LSA related information, wherein to generate the LSA, the standby board processing unit is to generate an LSA that corresponds to an interface according to the sequence of receiving the interface enabling notifications.

6. The distributed device of claim 5, wherein an identical interface index for a same interface is configured on said primary board and said standby board.

7. The distributed device of claim 5, wherein the machine readable instructions in the primary board memory are further to cause the primary board processing unit to, after a corresponding LSA is generated according to a route, back up the correspondence between said route and a link state identifier (LSID) of said LSA onto the standby board; and wherein the machine readable instructions in the standby board memory are further to cause the standby board processing unit to search for the stored LSID that corresponds to a route when generating an LSA according to the route; after having found the corresponding LSID, generate a corresponding LSA according to the found LSID; and if no corresponding LSID is found, carry out the searching again after a preset time.

8. The distributed device of claim 5, wherein said machine readable instructions in the primary board memory are further to cause the primary board processing unit to obtain a link state advertisement (LSA) carried in a received link state update (LSU) message, to determine whether said LSA carried in the received LSU message is stored on said primary board, and send said LSA carried in the received LSU message to said standby board in response to a determination that the LSA carried in the received LSU message is stored on the primary board and not send said LSA carried in the received LSU message to said standby board in response to a determination that the LSA carried in the received LSU message is not stored on the primary board; and wherein the machine readable instructions in said standby board are further to cause the standby board processing unit to receive and store the LSA carried in the received LSU message sent by said primary board.

9. A distributed device comprising:
   a main control board and an interface board, wherein said main control board comprises a primary board and a standby board, wherein:
   said primary board comprises a primary board processing unit and a primary board memory on which is stored machine readable instructions that are to cause the primary board processing unit to:
     send link state advertisement (LSA) related information to said standby board; and
     after a corresponding LSA is generated according to a route, back up the correspondence between said route and a link state identifier (LSID) of said LSA onto the standby board; and
   said standby board comprises a standby board processing unit and a standby board memory on which is stored machine readable instructions that are to cause the standby board processing unit to:
     receive the LSA related information sent by said primary board, and generate an LSA according to said LSA related information; and
     search for the stored LSID that corresponds to a route when generating an LSA according to the route; after having found the corresponding LSID, generate a corresponding LSA according to the found LSID; and if no corresponding LSID is found, carry out the searching again after a preset time.

10. The distributed device of claim 9, wherein an identical interface index for a same interface is configured on said primary board and said standby board.

11. The distributed device of claim 9, wherein said machine readable instructions in the primary board memory are further to cause the primary board processing unit to obtain a link state advertisement (LSA) carried in a received link state update (LSU) message, to determine whether said LSA carried in the received LSU message is stored on said primary board, and send said LSA to said standby board in response to a determination that the LSA carried in the received LSU message is stored on the primary board and not send said LSA carried in the received LSU message to said standby board in response to a determination that the LSA carried in the received LSU message is not stored on the primary board; and wherein the machine readable instructions in said standby board are further to cause the standby board processing unit to receive and store the LSA carried in the received LSU message sent by said primary board.

\* \* \* \* \*